US010768937B2

(12) United States Patent
Evers et al.

(10) Patent No.: US 10,768,937 B2
(45) Date of Patent: Sep. 8, 2020

(54) USING RETURN ADDRESS PREDICTOR TO SPEED UP CONTROL STACK RETURN ADDRESS VERIFICATION

(71) Applicant: Advanced Micro Devices, Inc., Santa Clara, CA (US)

(72) Inventors: Marius Evers, Santa Clara, CA (US); David A. Kaplan, Austin, TX (US); Debjit Das Sarma, San Jose, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 116 days.

(21) Appl. No.: 16/046,949

(22) Filed: Jul. 26, 2018

(65) Prior Publication Data

US 2020/0034144 A1    Jan. 30, 2020

(51) Int. Cl.
  *G06F 9/30* (2018.01)
  *G06F 9/38* (2018.01)
(52) U.S. Cl.
  CPC ........ *G06F 9/3016* (2013.01); *G06F 9/30058* (2013.01); *G06F 9/3861* (2013.01)
(58) Field of Classification Search
  None
  See application file for complete search history.

(56) References Cited

U.S. PATENT DOCUMENTS

| 6,289,444 | B1 * | 9/2001 | Nair | G06F 9/3806 |
| | | | | 712/243 |
| 6,647,490 | B2 * | 11/2003 | Keller | G06F 9/30149 |
| | | | | 712/233 |
| 7,836,290 | B2 * | 11/2010 | Chaudhry | G06F 9/3806 |
| | | | | 712/242 |
| 2003/0120906 | A1 * | 6/2003 | Jourdan | G06F 9/3802 |
| | | | | 712/242 |
| 2005/0076193 | A1 * | 4/2005 | Henry | G06F 9/3806 |
| | | | | 712/238 |
| 2005/0278516 | A1 * | 12/2005 | Ukai | G06F 9/30054 |
| | | | | 712/238 |

* cited by examiner

*Primary Examiner* — Eric Coleman
(74) *Attorney, Agent, or Firm* — Volpe and Koenig, P.C.

(57) ABSTRACT

Overhead associated with verifying function return addresses to protect against security exploits is reduced by taking advantage of branch prediction mechanisms for predicting return addresses. More specifically, returning from a function includes popping a return address from a data stack. Well-known security exploits overwrite the return address on the data stack to hijack control flow. In some processors, a separate data structure referred to as a control stack is used to verify the data stack. When a return instruction is executed, the processor issues an exception if the return addresses on the control stack and the data stack are not identical. This overhead can be avoided by taking advantage of the return address stack, which is a data structure used by the branch predictor to predict return addresses. In most situations, if this prediction is correct, the above check does not need to occur, thus reducing the associated overhead.

20 Claims, 6 Drawing Sheets

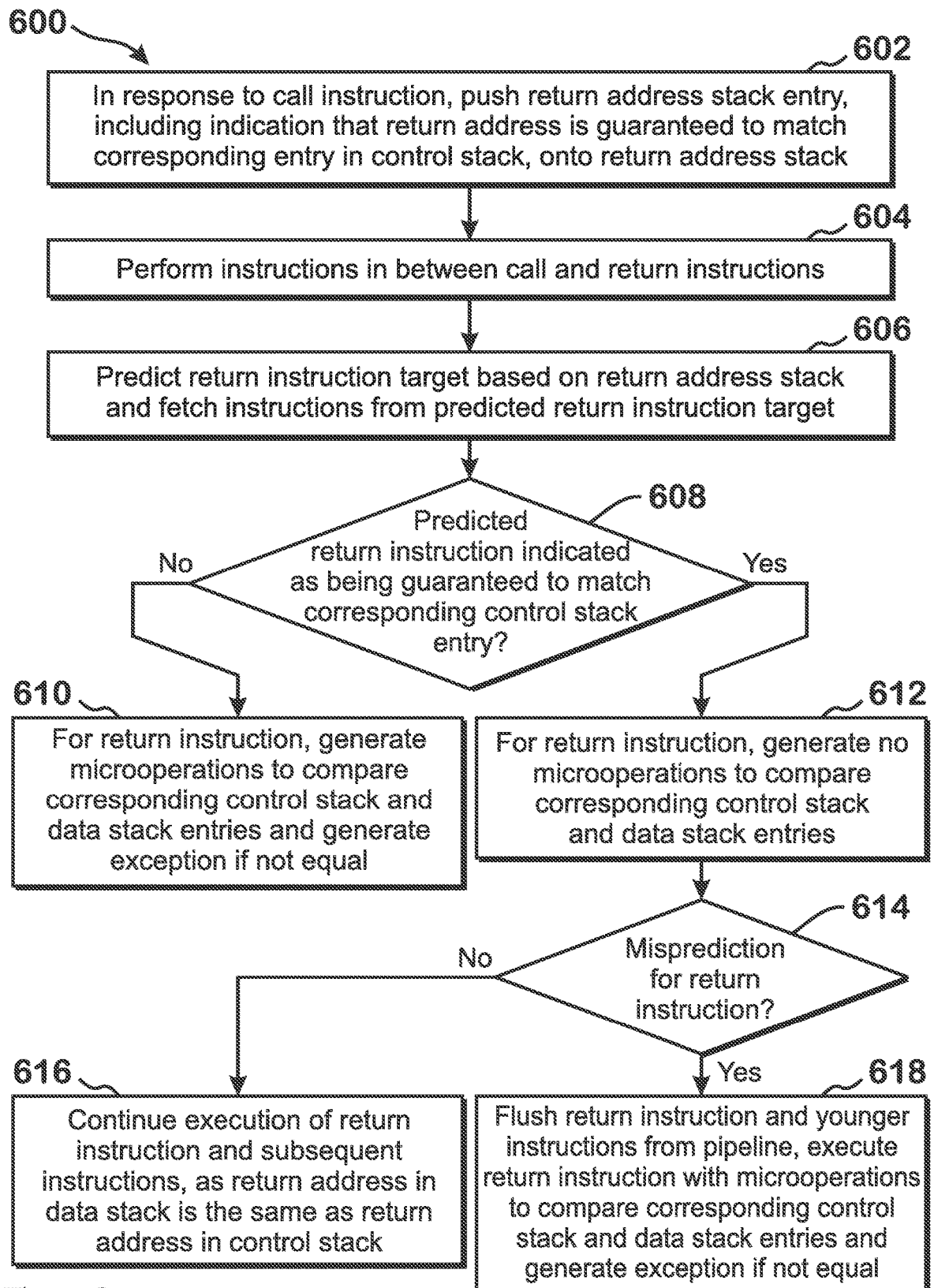

USING RETURN ADDRESS PREDICTOR TO SPEED UP CONTROL STACK RETURN ADDRESS VERIFICATION

BACKGROUND

The software execution model for calling and returning from a function dictates that upon calling a function, the return address for that function is pushed onto the data stack and upon returning from that function, the return address is popped from the data stack and control flows to that return address. Some security exploits can take advantage of this use of the stack by overwriting the stack entry for a return address with a malicious return address that alters control flow to a location as desired by the attacker. Improvements to techniques for preventing this type of security exploit are constantly being made.

BRIEF DESCRIPTION OF THE DRAWINGS

A more detailed understanding may be had from the following description, given by way of example in conjunction with the accompanying drawings wherein:

FIG. 6 illustrates an example of a mechanism for reducing overhead associated with comparing return addresses on a data stack against return addresses on a control stack.

DETAILED DESCRIPTION

Figure 1:
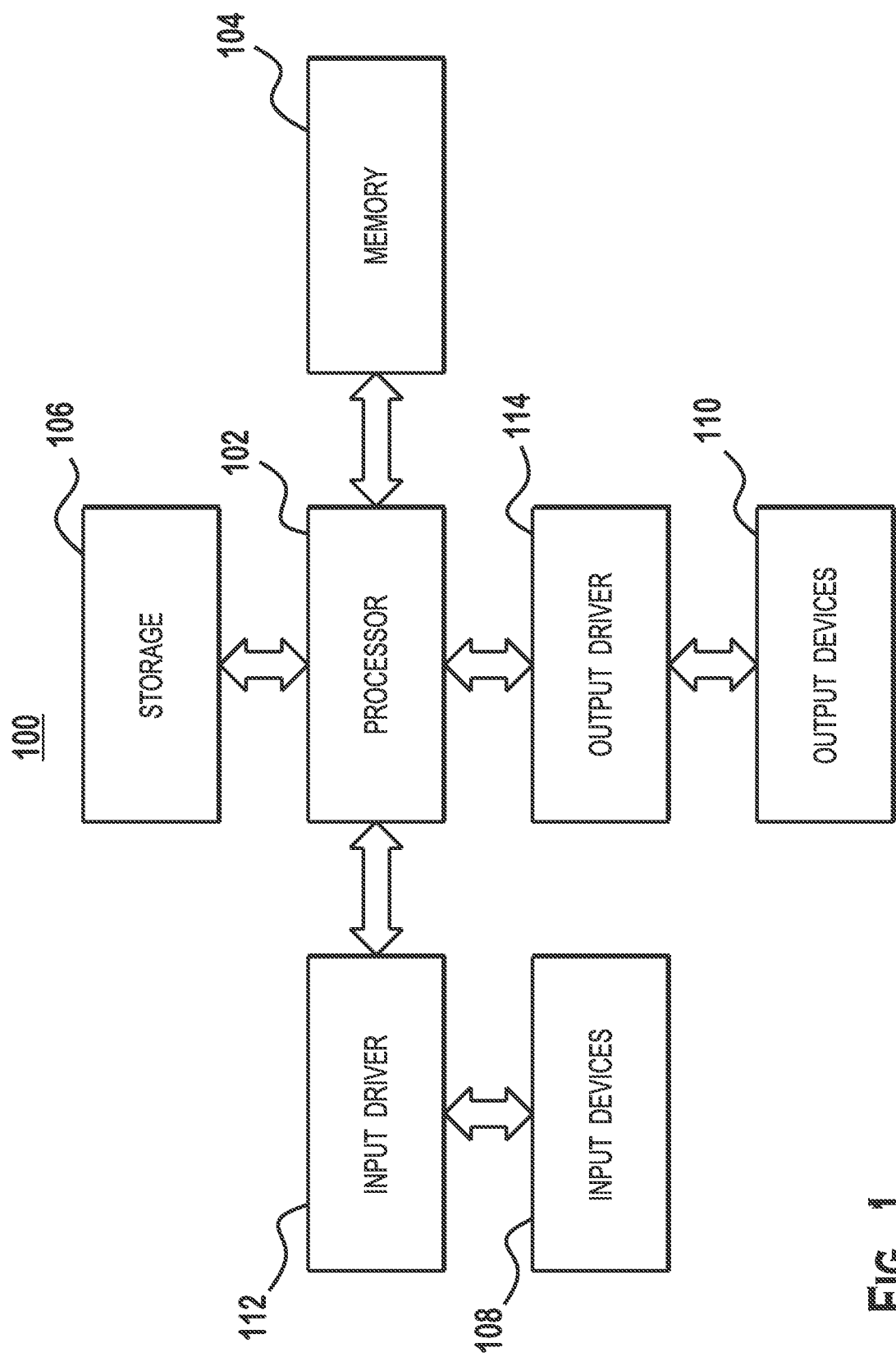
FIG. 1 is a block diagram of an example device in which one or more disclosed features may be implemented.

The present disclosure provides techniques for reducing the overhead associated with verifying function return addresses to, for example, protect against certain types of security exploits. More specifically, the software execution model for calling and returning from a function dictates that upon calling a function, the return address for that function is pushed onto the data stack and upon returning from that function, the return address is popped from the data stack and control flows to that return address. Some security exploits can take advantage of this use of the stack by overwriting the stack entry for a return address with a malicious return address that alters control flow to a location as desired by the attacker. To hinder this type of exploit, a separate data structure referred to as a control stack is used in addition to the data stack. The control stack includes return addresses for functions in the same order as the data stack but is not overwritable using traditional security exploits. When a return instruction is executed, the processor checks the return addresses on the data stack and the control stack and issues an exception if they are not the same. This represents some overhead but is useful to prevent the exploits described above.

The technique described herein reduces the frequency with which this check needs to be made by taking advantage of a return address stack in the branch prediction unit. The branch predictor uses this stack to predict the target of return instructions and in most situations, the contents of the return address stack mirrors that of the control stack. Further, there already exists a mechanism by which the address of the return address stack is checked against that in the data stack—the misprediction detection mechanism. Thus unless a return instruction is determined to have mispredicted, in most situations, it is known that the return address for that return instruction on the return address stack, and thus the corresponding address on the control stack, are the same as the corresponding return address on the data stack and that a security attack has not occurred. Thus, in most situations, when the processor encounters a return instruction, it does not perform the explicit check between the control stack and the data stack. On the other hand, if the processor is determined to have mispredicted, then the processor performs that check. It is possible for the return address stack to not be guaranteed to be the same as the control stack, in which case a correct prediction is not guaranteed to indicate that the control stack is the same as the data stack. Techniques detailed elsewhere herein describe situations in which this difference between the return address stack and the control stack can occur. If such a situation occurs, the processor performs the check between the control stack and data stack even if a misprediction has not occurred. Information regarding whether return addresses in the return address stack are guaranteed to be the same as those in the control stack is stored in the return address stack and used to direct the processor regarding whether to perform the check between the control stack and the data stack.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 includes an input driver 112 and an output driver 114. It is understood that the device 100 may include additional components not shown in FIG. 1.

The processor 102 is a computing device capable of executing software, such as a microprocessor, microcontroller, or other device, as is known. The memory 104 stores instructions and data for use by the processor 102. In an example, the memory 104 is located on the same die as the processor 102. In another example, the memory 104 is located on a different die than the processor 102. The memory 104 includes a volatile memory, such as random access memory (RAM), dynamic RAM, or a cache. In some examples, the memory 104 includes non-volatile memory.

The storage device 106 includes a fixed or removable storage such as a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, a network connection (e.g., a wireless local area network card for transmission and/or reception of wireless IEEE 802 signals), and/or other input devices. The output devices 110 include a display, a speaker, a printer, a haptic feedback device, one or more lights, an antenna, a network connection (e.g., a wireless local area network card for transmission and/or reception of wireless IEEE 802 signals), and/or other output devices.

The input driver 112 communicates with the processor 102 and the input devices 108, and permits the processor 102 to receive input from the input devices 108. In various examples, the device 100 includes one or more than one input driver 112 (although only one is illustrated). The input driver 112 is embodied as custom, fixed function hardware, programmable hardware, software executing on a processor (such as processor 102), or any combination thereof. In various examples, an input driver 112 includes an expansion card inserted into a port such as a peripheral component interconnect express (PCIe) port, which is coupled both to the processor 102 and to an input device 108. The output driver 114 communicates with the processor 102 and the output devices 110, and permits the processor 102 to send output to the output devices 110. In various examples, the devices 100 includes one or more than one output driver 114 (although only one is illustrated). The output driver 114 is embodied as custom, fixed function hardware, programmable hardware, software executing on a processor (such as processor 102), or any combination thereof. In various examples, an output driver 114 includes an expansion card inserted into a port such as a peripheral component interconnect express (PCIe) port, which is coupled both to the processor 102 and to an input device 108.

Figure 2:
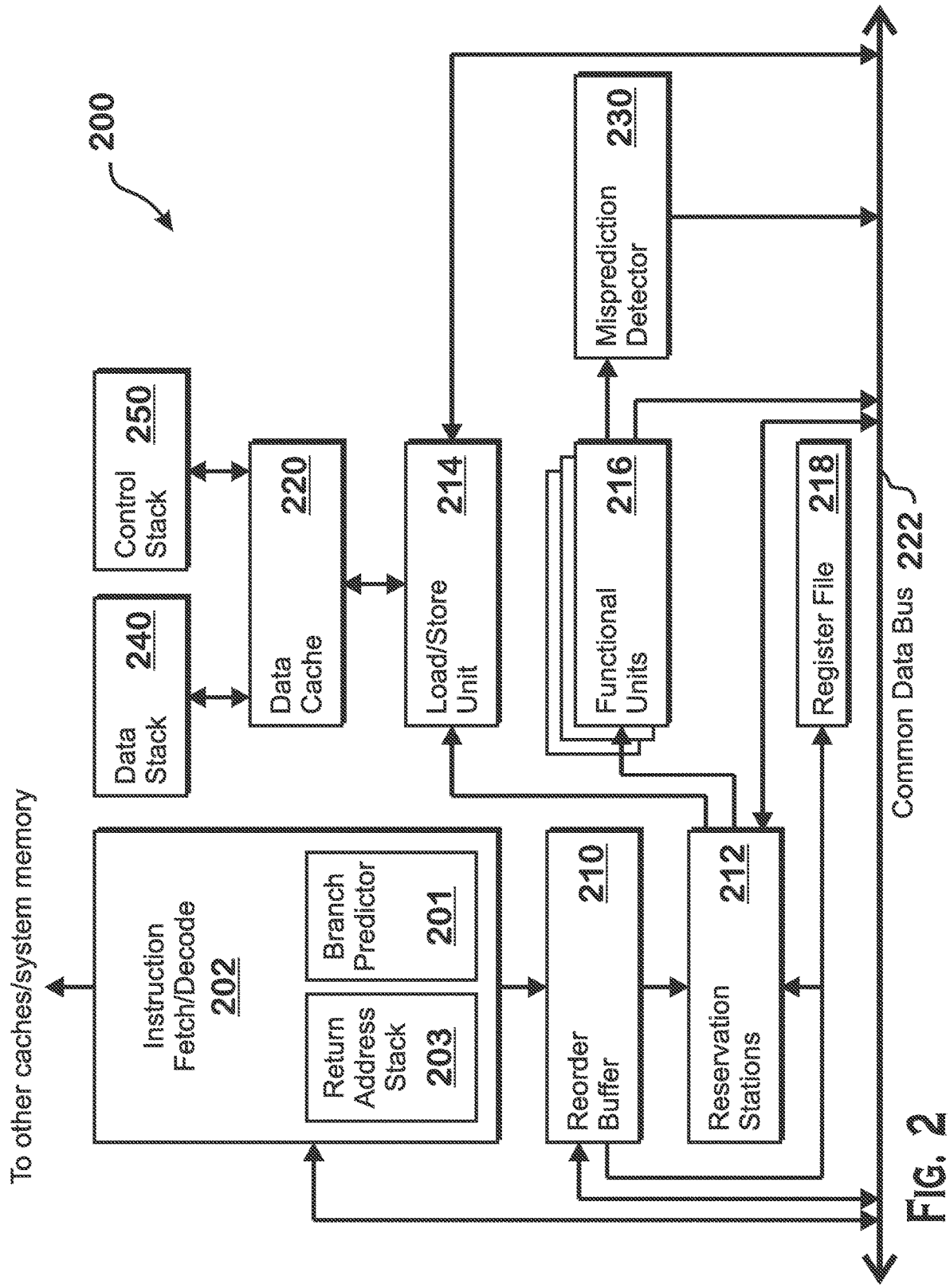
FIG. 2 is a block diagram of an instruction execution pipeline of the processor of FIG. 1, according to an example.

FIG. 2 is a block diagram of an instruction execution pipeline 200, included within the processor 102 of FIG. 1, according to an example. The instruction execution pipeline 200 retrieves instructions from memory and executes the instructions, outputting data to memory and modifying the state of elements within the instruction execution pipeline 200, such as registers within register file 218.

The instruction execution pipeline 200 includes an instruction fetch and decode unit 202 that fetches instructions from system memory (such as memory 104) via an instruction cache and decodes the fetched instructions. Decoding the fetched instructions converts the fetched instructions to micro-operations (also just "operations") for execution by the instruction execution pipeline 200. The term "instructions" refers to tasks that are specified in an instruction set architecture for the processor 102. Instructions can be specified for execution by software. Micro-operations are sub-tasks that are not generally directly usable by software. Instead, micro-operations are the individual tasks actually carried out by the processor 102 in order to perform the instructions requested by software. Decoding instructions thus includes identifying control signals to be applied to functional units 216, one or more load/store units 214, and other portions of the instruction execution pipeline 200. Decoding some instructions results in multiple micro-operations per instruction, while decoding other instructions results in one micro-operation per instruction. Although described in a particular manner, the decoding performed by the instruction fetch and decode unit 202 may be performed in ways other than as described herein (i.e., without using micro-operations).

The instruction fetch and decode unit 202 includes a branch predictor 201. The branch predictor 201 generates predicted addresses for consumption by the rest of the instruction fetch and decode unit 202. Through known techniques, the branch predictor 201 attempts to identify the sequence of instructions, specified as a sequence of predicted instruction addresses, that software executing in the instruction execution pipeline 200 is to execute. This instruction sequence identification includes branch prediction, which uses various execution state information (such as current instruction pointer address, and branch prediction history that, in various examples, includes data indicating the history of whether particular branches were taken or not, and/or other data).

A misprediction detector 230, in communication with the functional units 216, detects whether a particular branch mispredicts by comparing the computed target to the predicted target of the branch instruction, along with comparing the computed taken/not taken conditional to the predicted conditional for conditional branch instructions. If the misprediction detector 230 detects that a misprediction occurs, then the instruction execution pipeline 200 performs actions to remedy the misprediction, such as quashing operations for instructions from a mispredicted branch path and fetching instructions from the correct path. There are a wide variety of branch prediction techniques and in various examples, the branch predictor 201 uses any technically feasible branch prediction technique to identify a sequence of predicted instruction addresses.

A return address stack 203 assists the branch predictor 201 in predicting the targets of return instructions. Return instructions are instructions that return from execution of a function. Because functions can be called from different instruction addresses, a single return instruction may have multiple return addresses depending on the code location (i.e., instruction address) from which that function is called. Further, when the branch predictor 201 encounters a return instruction, the actual target of that instruction is not necessarily known by the branch predictor 201. The return address stack 203 is a small dedicated hardware structure that stores predicted return addresses for call instructions encountered by the branch predictor 201 so that the branch predictor can predict control flow paths past a return instruction. To add or remove addresses to the return address stack 203, when a call instruction is predicted by the branch predictor 201, the branch predictor 201 pushes the address of the instruction immediately after the call instruction onto the return address stack 203 and when a return instruction is predicted to occur, the branch predictor 201 pops a return address off the stack and uses that address as the predicted target of the return instruction. This pushing/popping of return addresses in response to call and return instructions helps the order of the return addresses within the return address stack 203 to match the function call sequence.

Just as with any other type of branch instruction, it is possible for a misprediction to occur for predicted return addresses. In this scenario, the instruction execution pipeline 200 flushes instructions younger than the return instructions and re-starts fetching at the now known return address.

The execution pipeline 200 also includes functional units 216 that perform calculations to process the micro-operations, one or more load/store units 214 that load data from or store data to system memory via a data cache 220 as specified by the micro-operations, and a register file 218 that includes registers that store working data for the micro-operations.

A reorder buffer 210 tracks instructions that are currently in-flight and ensures in-order retirement of instructions despite allowing out-of-order execution while in-flight. "In-flight" instructions refers to instructions that have been received by the reorder buffer 210 but have not yet "retired"—that is, have not yet had results committed to the architectural state of the processor (e.g., results written to architectural registers). When all micro-operations of an instruction have been performed and all older instructions have retired, the instruction can be retired. Reservation stations 212 maintain in-flight micro-operations and track operands for micro-operations. When all operands are ready for execution of a particular micro-operation, reservation stations 212 send the micro-operation to a functional unit 216 or a load/store unit 214 for execution.

Various elements of the instruction execution pipeline 200 communicate via a common data bus 222. For example, the functional units 216 and load/store unit 214 write results to the common data bus 222 which may be written to reservation stations 212 for execution of dependent instructions/micro-operations and to the reorder buffer 210 as the final processing result of an in-flight instruction that has finished execution.

A data stack 240 is present in memory (such as memory 104) and is used by software for various purposes including storing function parameters, local variables, and return addresses. A control stack 250 stores control flow data for protection against certain security exploits as discussed in more detail elsewhere herein. While FIG. 2 shows one example of a processor pipeline 200, those of skill in the art will understand that the teachings of the present disclosure apply to other pipeline architectures as well.

Figure 3:
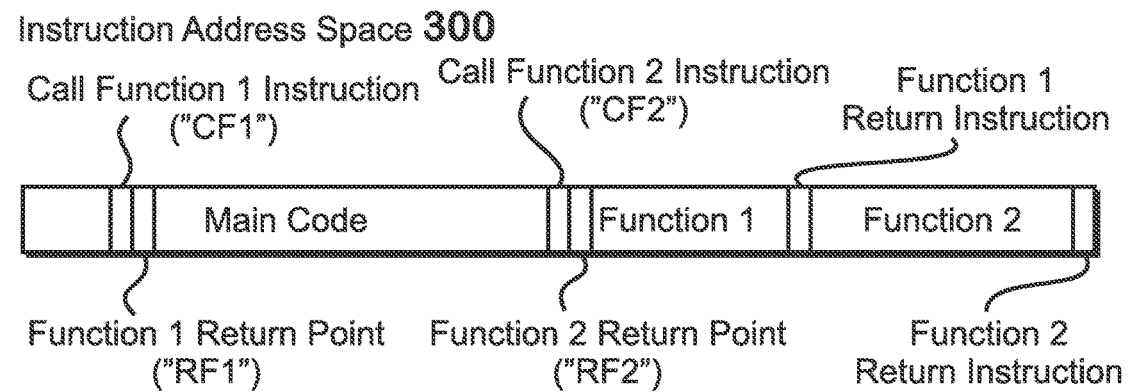
FIG. 3 illustrates an example of operation of the instruction execution pipeline, including operations related to the data stack.
Figure 3:
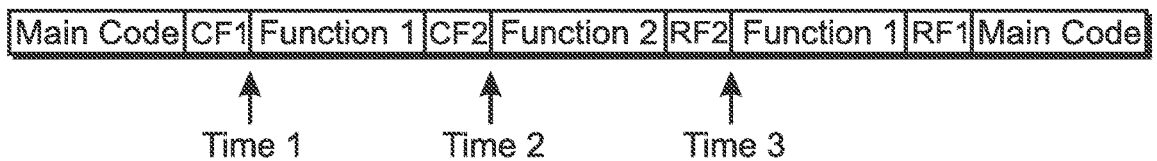
Figure 3:
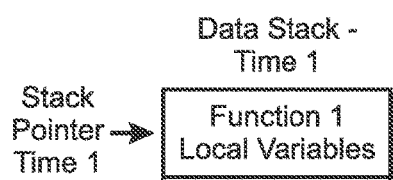
Figure 3:
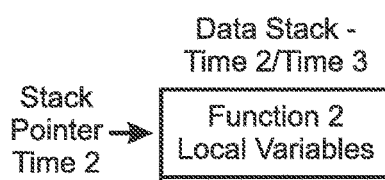
Figure 3:
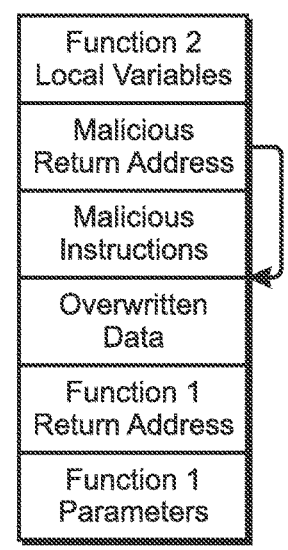

FIG. 3 illustrates an example of operation of the instruction execution pipeline 200, including operations related to the data stack 240. An instruction address space 300 including a section of main code, function 1, and function 2, is illustrated. The section of main code includes a call instruction to call function 1 ("CF1") and an instruction after that call instruction, illustrated as the function 1 return point ("RF1"). Function 1 includes a call instruction to call function 2 ("CF2") and an instruction after that call instruction, illustrated as the function 2 return point ("RF2"). Functions 1 and 2 also include return instructions (illustrated as function 1 return instruction and function 2 return instruction).

FIG. 3 also illustrates the order of program flow 302. The portion of main code prior to the call function 1 instruction executes. Then the call function 1 instruction executes, which brings execution into function 1. Subsequently, the call function 2 instruction executes, bringing execution into function 2. When function 2 executes a return instruction, execution flows back to the function 2 return point in function 1, and when function 1 executes a return instruction, execution flows back to the main code at return point 1.

The contents of the data stack 240 are also shown for three time points as stack contents 304. Specifically, at time 1, after the call function 1 instruction has executed, the data stack 240 stores the parameters for function 1 and the function 1 return address (RF1). Function 1 local variables are allocated at some time after control flow passes into function 1. Time 1 refers to the time after these local variables have been allocated. Similarly, time 2 and time 3 also refer to points in time after local variables are allocated for respective functions. The stack pointer points to the top of the stack (the function 1 return address), reflecting these most recent additions to the stack. If desired, function 1 can also allocate its local variables on the stack. The data stack contents are also shown at time 2, which occurs after the call to function 2 instruction has executed. At time 2, the stack includes the contents from time 1 but also includes the function 2 parameters and the function 2 return address (RF2). The stack pointer points to the function 2 return address, again reflecting these most recent additions to the stack. If desired, function 2 can also allocate its local variables on the stack. At time 3, which occurs after the return from function 2 to function 1 (after control returns to RF2), the contents of the data stack 240 are the same as after time 2 (assuming these values have not been overwritten for some other reason), except that the stack pointer now points to the function 1 local variables. Specifically, because control flow has returned from function 2, the function 2 values, including the function 2 return address which tells the processor where to return to, have been popped off the stack and thus the stack pointer at time 3 is decremented to the function 1 values. While FIG. 3 described operation of a stack that grows in ascending order such that the stack pointer is incremented when pushing values onto the stack and decremented when popping values off the stack, other stacks operate in descending order (i.e. pushes increment and pops decrement) and the mechanisms described herein work similarly for descending stacks.

The above function execution paradigm using the stack is the basis for a security exploit known as a stack overflow attack or stack smashing attack, illustrated by the stack overflow attack 306. In this example, the local variables of function 1 includes a buffer allocated to be a certain size (such as a char array—a string—having a fixed size). Further, function 1 passes a pointer to that buffer as a parameter to function 2. Function 2 accepts user-modifiable input and writes that user-modifiable input into the buffer. An attacker provides malicious instructions and an address to the beginning of such instructions as the user-modifiable input to be placed into that buffer. The ability of a user to place arbitrary information into such a buffer is usually due to a software bug such as failure to check the input for correct size. The effect of this is to overwrite the function 2 return address to point to the maliciously written instructions, instead of to the function 2 return point RF2, as well as to write the malicious instructions onto the stack. Then, when the processor pops the function 2 return address to determine where to return control flow to, the processor returns control flow to, and executes, the malicious instructions on the data stack 240, instead of returning to function 1.

The effectiveness of the above-illustrated stack smashing attack has been reduced with the introduction of a no-execute bit. More specifically, with this bit, the processor will only execute instructions if a corresponding bit indicates that execution is allowed. Because the data stack 240 is for data, the no-execute bit would indicate that no execution is allowed for the data stack 240. Thus, when the stack overflow attack writes a malicious return address and malicious instructions into the stack, and the malicious return address redirects control flow to the malicious instructions on the stack, the processor detects that the no-execute bit is set, and does not execute the malicious code. Thus, the basic stack smashing attack is foiled with the no-execute bit.

Figure 4:
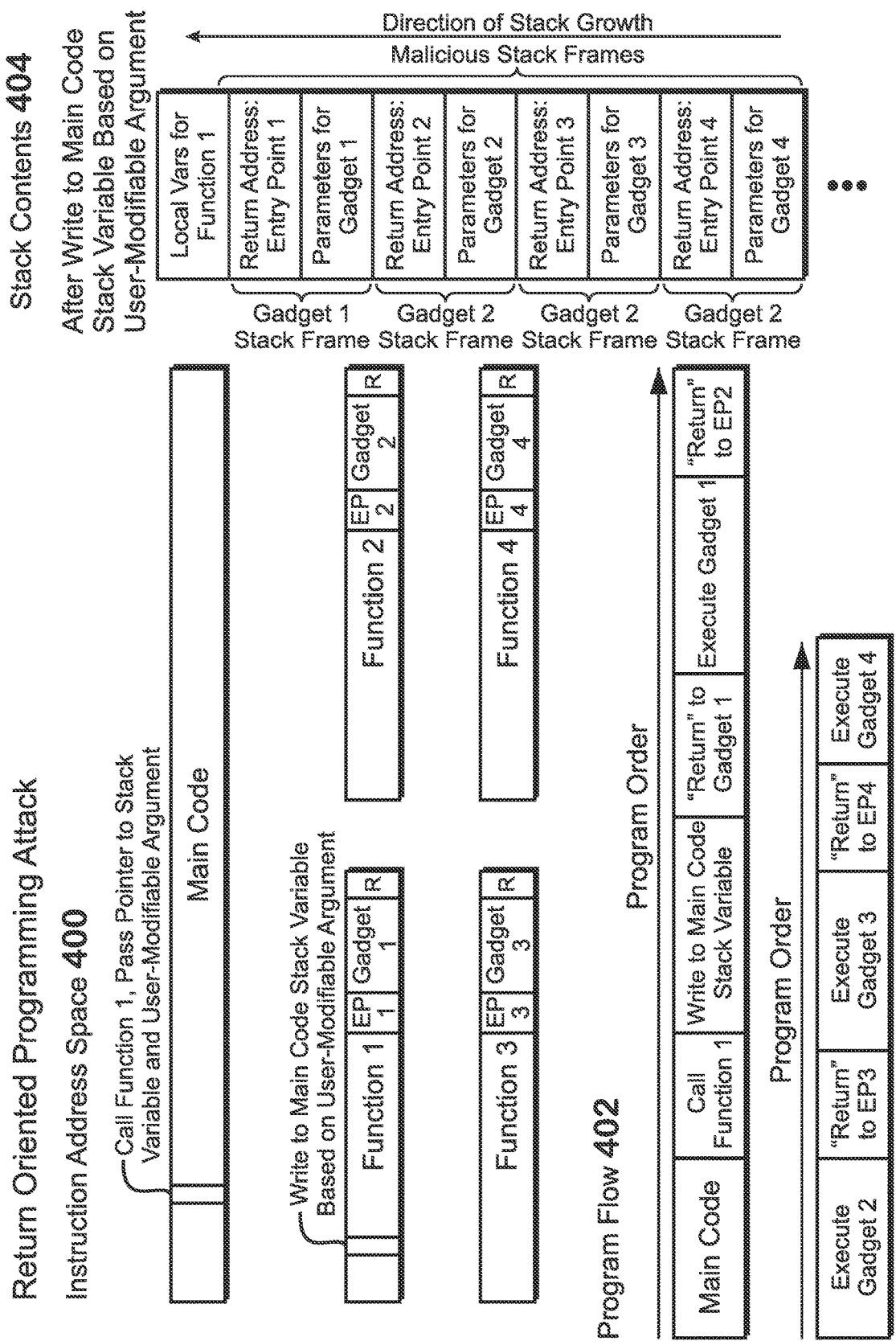
FIG. 4 illustrates an example of a return oriented programming attack.

FIG. 4 illustrates an example of a more complicated attack—a return oriented programming attack. In this example, instead of writing a malicious return address and malicious instructions to the stack, an attacker instead writes a malicious sequence of function data onto the stack. This malicious sequence causes the processor to "return" to any arbitrary code point, execute the instructions at that point, "return" to another arbitrary code point, execute instructions at that point, and so on.

An example of this type of execution is illustrated. A section of main code is illustrated including an instruction to call function 1. In calling function 1, the main code passes a pointer to a fixed-size buffer that is a stack variable for the main code. Function 1 includes an instruction to write to the stack variable based on a user-modifiable argument. The user creates a buffer that consists of malicious data for the stack and provides that buffer as the user-modifiable argument. As with the stack smashing attack, the ability for a user to write to this buffer is often the result of a software bug such as failing to check the bounds for received input. The malicious buffer overwrites the stack contents. The modified stack contents include different malicious stack frames for different portions of code referred to as gadgets. Gadgets are portions of the instructions of software identified by an attacker as being useful. The attacker pieces together different gadgets to accomplish a desired task.

Each malicious stack frame includes the return address for the beginning of the next gadget, as well as parameters for the current gadget. The top of the maliciously written stack is the stack frame for the function in which the malicious modification to the stack is made, and includes, as a return address, the entry point of the first gadget to execute. The modified stack contents include the modified stack frame for function 1, which includes, as the return address, entry point 1 (which happens to also be in function 1). Thus after function 1 executes a return instruction, control flow jumps to entry point 1 ("EP1") and the stack pointer moves to the top of the gadget 1 stack frame. Gadget 1 executes with the maliciously written parameters for gadget 1, and when the return instruction is reached, control flow jumps to entry point 2 ("EP2"), the beginning of gadget 2. Similarly, the gadget 2 stack frame causes gadget 2 to execute with maliciously written parameters, and the gadget 3 stack frame causes gadget 3 to execute with maliciously written parameters.

The return oriented programming attack sidesteps the no-execute bit protection because the stack no longer includes code for execution. Instead, the stack acts to direct control flow. The malicious return addresses and function parameters are not instructions for execution but are parameters for use by instructions that already exist. All instructions to be executed are part of the already existing program and are thus permitted to execute by the processor.

Figure 5:
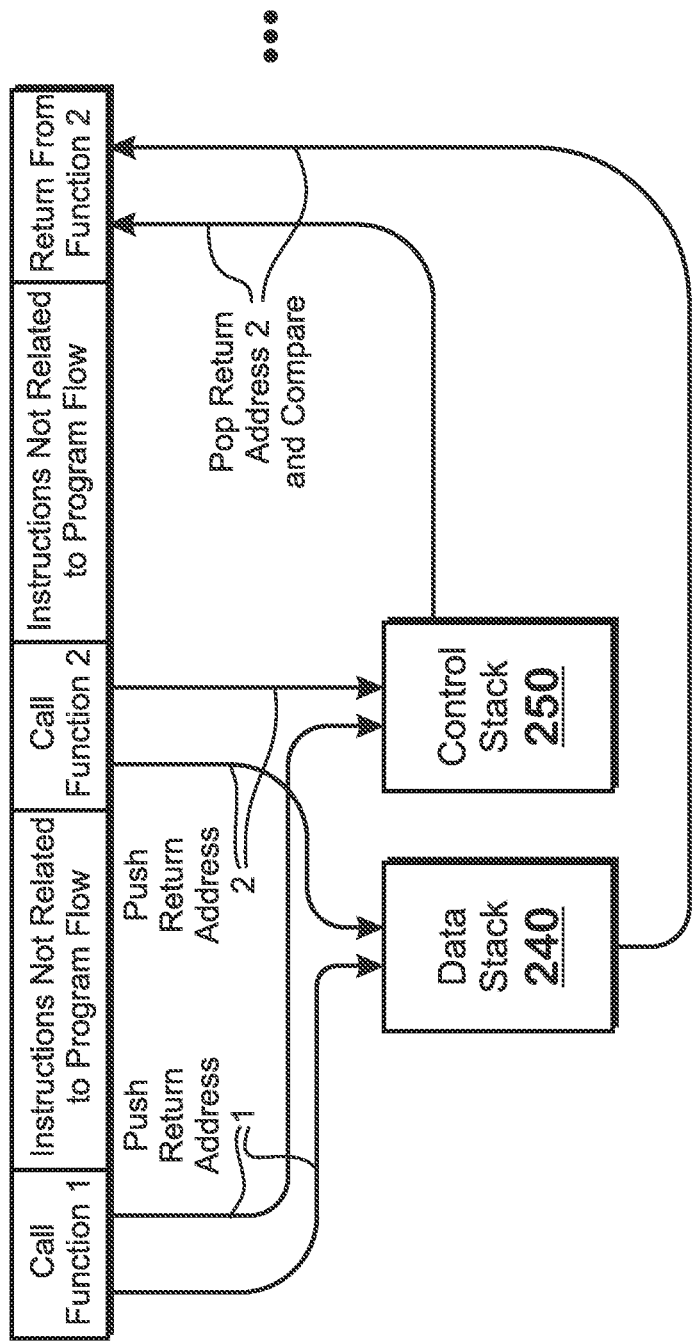
FIG. 5 illustrates a mechanism for protecting against return oriented programming attacks, according to an example.

FIG. 5 illustrates a mechanism for protecting against return oriented programming attacks, according to an example. As described above, even with a no execute bit, the data stack 240 is subject to the return oriented programming attack, in which the data stack 240 is converted into a data structure controlling program control flow via creation of fake stack frames with fake return addresses.

Another stack structure called the control stack 250 is provided to prevent the above attacks. The control stack 250 is used to verify the return addresses on the data stack 240. The control stack does not hold general purpose data structures and is typically protected from being modified by normal memory operations and is therefore less vulnerable to attacks. If the return address present on the control stack 250 does not match that on the data stack 240, then an attack may have occurred.

The processor 102 utilizes the control stack 250 as follows. A call function instruction results in the return address being pushed onto the control stack 250, in addition to the usual push of the return address onto the data stack 240. More specifically, when the instruction fetch and decode unit 202 encounters a call function instruction, the instruction fetch and decode unit 202 generates a micro-operation to push the return address onto the control stack 250. When the instruction fetch and decode unit 202 encounters a return instruction, the instruction fetch and decode unit 202 generates micro-operations to pop the return addresses from the control stack 250 and the data stack 240 and compare them. If the addresses are equal, then execution proceeds normally but if the addresses are not equal, then the processor generates an exception for handling (e.g., by the operating system).

The pop and compare micro-operations represent overhead for every function call that occurs. A mechanism for reducing that overhead is now described with respect to FIG. 6. In general, this mechanism takes advantage of the existence of the return address stack 203. More specifically, when return address prediction occurs, the instruction execution pipeline 200 eventually checks whether that address has been mispredicted. If the return address has not been mispredicted, then by definition, the predicted address matches the address on the data stack 240 (as the check for misprediction is a check to determine whether the predicted return address matches the address that would be achieved according to regular program flow, which is the address that would be popped off the data stack 240). In most situations, the predicted return address from the return address stack 203 can be guaranteed to match the return address from the control stack 250. This is because the control stack 250 and the return address stack 203 are pushing and popping the same addresses. More specifically, when a call instruction occurs, the address of the instruction immediately after the call instruction is pushed onto the control stack 250 and the return address stack 203 and when a return instruction occurs, the top address of the control stack 250 and the return address stack 203 are popped. As described previously, the return address stack is guaranteed to match the data stack if there is no mispredict, so if the return address stack is guaranteed to match the control stack, the control stack is also guaranteed to match the data stack in the absence of a mispredict. The mechanism for determining which return address predictions are guaranteed to match the control stack is described later.

Thus, in situations where the return address stack is guaranteed to match the control stack, when a return instruction is encountered by the instruction fetch and decode unit 202, the instruction fetch and decode unit 202 does not generate the micro-operations to read the return address off the control stack 250 and compare that return address to the return address popped off the data stack 240, unless a misprediction occurs upon execution of the return instruction, in which case the pop and compare micro-operations are generated for the second, "correct" execution of the return instruction after misprediction. (Note, the word "guaranteed" as used herein refers to the conditions set forth herein that describe the situations in which such a guarantee occurs). The instruction fetch and decode unit 202 generates the micro-operation to pop the return address off the data stack regardless of whether the control stack read was skipped because doing so constitutes normal execution of the return instruction, and also because doing so is the manner by which a misprediction would be detected. In addition, the control stack pointer is decremented similar to a pop regardless of whether the memory read of the control stack was skipped.

As the above illustrates, the check of the control stack against the data stack is obtained "for free" by the prediction verification mechanism. However, to obtain this benefit, it must be known that the address popped off the return address stack 203 is guaranteed to be the same as the address that would be popped off of the control stack 250. These addresses are identical in most but not all situations. The return address stack 203 maintains an indication for each entry (i.e., each predicted return address stored in the return address stack 203) of whether the return address for that entry is guaranteed to match the corresponding return address on the control stack 250. Each such indication is initialized as not guaranteed. When a return address is pushed onto the stack due to a call instruction, the indication is set to "guaranteed" for that return address. If the control stack is explicitly manipulated, for example, by an instruction that explicitly manipulates the control stack pointer or control stack or by directly writing to the memory location of the control stack (e.g., by a thread other than the thread for which the control stack is tracking return addresses, detected through comparing incoming memory probes against a region of addresses above and below the current control stack pointer that covers the maximum number of entries in the return address stack), then all entries in the return address stack 203 are marked as not guaranteed to be identical to the control stack 250. If a buffer underflow occurs on the return address stack 203, then whenever the return address stack 203 provides a predicted address, the return address stack 203 indicates that the predicted address is not guaranteed to match the control stack 250, until either a call is predicted, or a misprediction recovery occurs, both of which resolve the underflow. After that point, predicted return addresses from the return address stack 203 are again considered to be guaranteed to match the control stack as long as the return address stack entry used for the prediction is marked as guaranteed. A buffer underflow is an attempt to pop a return address off the return address stack 203 when the return address stack 203 indicates that there are no entries that remain on the return address stack 203 (i.e., all entries have already been popped off and the return address stack 203 is thus, in effect, "empty").

The indication of whether a predicted return address is guaranteed to match the control stack 250 is propagated to the decode portion of the instruction fetch and decode unit 202, which decodes the return instruction based on this indication. If the indication indicates the predicted return address is guaranteed to match the control stack 250, then the instruction fetch and decode unit 202 does not generate micro-operations to read the return address off the control stack 250 and compare that return address to the return address popped off of the data stack 240. If the indication indicates that the predicted return instruction is not guaranteed to match the control stack 250, then the instruction fetch and decode unit 202 generates a micro-operation to pop the return address off the control stack 250 and compare that return address to the return address popped off of the data stack 240.

FIG. 6 is a flow diagram of a method 600 for verifying a return address, according to an example. Although described in the context of FIGS. 1-5, those of skill in the art will understand that any system that performs the steps of FIG. 6 in any technically feasible order falls within the scope of the present disclosure.

The method 600 begins at step 602, where, in response to a call instruction, the branch predictor 201 pushes the return address for the call instruction onto the return address stack 203. The return address is the address of the instruction immediately after the call instruction. The return address pushed onto the return address stack 203 also includes an indication that the return address is guaranteed to be the same as the return address on a control stack 250.

At step 604, the instruction execution pipeline 200 performs instructions after the call instruction and before a corresponding return instruction (which could of course include other call instructions and return instructions). At step 606, the branch predictor 201 predicts the return instruction target based on the return address pushed at step 602, and transmits the instruction addresses to other portions of the instruction fetch and decode unit 202, which fetches instructions after the predicted return target.

At step 608, a decode unit of the instruction fetch and decode unit 202 determines whether the predicted return address is guaranteed to match the corresponding control stack entry, based on the indication retrieved by the branch predictor 201 from the return address stack 203. If the predicted return address is guaranteed to match the corresponding control stack entry according to the indication, then the method 600 proceeds to step 612, and if the predicted return address is not guaranteed to match the corresponding control stack entry according to the indication, then the method 600 proceeds to step 610. At step 610, the decode unit of the instruction fetch and decode unit 202 generates micro-operations to compare the control stack entry and data stack entry for the return instruction for which the return target is predicted, and to generate an exception if the addresses are not equal.

At step 612, the decode unit of the instruction fetch and decode unit 202 generates no micro-operations to compare corresponding control stack and data stack entries for the return instruction. The return instruction is executed by the instruction execution pipeline 200 and the misprediction detector 230 determines whether a misprediction occurs. A misprediction occurs if the return address actually calculated by the instruction execution pipeline 200 differs from the return address predicted based on the return address stack 203. If a misprediction occurs, then the method 600 proceeds to step 618, and if a misprediction does not occur, then the method 600 proceeds to step 616.

At step 616, since a misprediction has not occurred, execution of and past the return instruction continues, because it has been determined that the data stack and the control stack have the same return address. At step 618, because a misprediction has occurred, the return instruction and younger instructions are flushed from the instruction execution pipeline 200. Note that unlike normal misprediction recovery that only flushes the instructions younger than the return, the return itself is also flushed because it needs to be re-executed with additional checks. Further, the instruction fetch and decode unit 202 fetches the return instruction and subsequent instructions, and generates, for the return instruction, micro-operations to compare the control stack and data stack entries for the return address and generate an exception if not equal.

An additional improvement involving reducing use of the control stack is now described. When a call instruction occurs with the additional improvement, the processor does not write the return address to the control stack in most situations saving the overhead of a memory write operation. However, control stack values are written in a few situations. When a predicted call instruction would cause an overflow in the return address stack 203 (more values have been pushed onto the return address stack 203 than the size of that stack), the return address that is overwritten (typically the oldest return address) is written to the control stack 250 by creating an operation to push that value to the control stack. The value is written to an address offset from the current control stack pointer by the call depth of that return address stack entry multiplied by the address size (typically 8 bytes for a 64-bit architecture). When a control stack manipulation instruction is used, the full contents of the return address stack 203 are written to the control stack 250. When a task switch occurs, a virtual machine switch occurs, the privilege level of the running software changes, or other changes that change which control stack is active, are made, all the guaranteed entries in the return address stack 203 are written to the control stack 250 prior to performing the operation that triggered the return address stack write. Before writing the return address stack 203 to the control stack 250, the instruction fetch and decode logic waits for all older instructions to retire and then creates operations to write the contents of the return address stack 203 to the control stack. The return address stack values are written to an address offset from the current control stack pointer by the call depth of that return address stack entry multiplied by the address size (typically 8 bytes for a 64-bit architecture). Upon completion of the write, the guaranteed indications for the written entries are cleared.

A method for executing a return instruction on a processor is provided. The method includes predicting a first target return address for a first return instruction based on a first return address stack entry, responsive to detecting that a first indicator associated with the first return address stack entry indicates that the first predicted target return address is not guaranteed to match a corresponding entry of a control stack, checking the corresponding entry of the control stack against a corresponding entry of a data stack to verify the return address for the first return instruction, predicting a second target return address for a second return instruction based on a second return address stack entry, and responsive to detecting that a second indicator associated with the second return address stack entry indicates that the second predicted target return address is not guaranteed to match a corresponding entry of a control stack, foregoing checking the corresponding entry of the control stack against a corresponding entry of the data stack for the second return instruction.

A computing pipeline for executing a return instruction is provided. The computing pipeline includes a return address stack, a misprediction detector, a decode unit, and a branch predictor. The branch predictor predicts a first target return address for a first return instruction based on a first return address stack entry, and predicts a second target return address for a second return instruction based on a second return address stack entry. Responsive to the decode unit detecting that a first indicator associated with the first return address stack entry indicates that the first predicted target return address is not guaranteed to match a corresponding entry of a control stack, the decode unit generates first micro-operations for the first return instruction, wherein the first micro-operations check the corresponding entry of the control stack against a corresponding entry of a data stack to verify the return address for the first return instruction. Responsive to the decode unit detecting that a second indicator associated with the second return address stack entry indicates that the second predicted target return address is not guaranteed to match a corresponding entry of a control stack, the decode unit foregoes generating second micro-operations for the second return instruction that check the corresponding entry of the control stack against a corresponding entry of the data stack for the second return instruction.

A computing device including a memory that stores instructions and a computing pipeline for executing a return instruction from the memory is provided. The computing pipeline includes a return address stack, a misprediction detector, a decode unit, and a branch predictor. The branch predictor predicts a first target return address for a first return instruction based on a first return address stack entry, and predict a second target return address for a second return instruction based on a second return address stack entry. Responsive to the decode unit detecting that a first indicator associated with the first return address stack entry indicates that the first predicted target return address is not guaranteed to match a corresponding entry of a control stack, the decode unit generates first micro-operations for the first return instruction, wherein the first micro-operations check the corresponding entry of the control stack against a corresponding entry of a data stack to verify the return address for the first return instruction. Responsive to the decode unit detecting that a second indicator associated with the second return address stack entry indicates that the second predicted target return address is not guaranteed to match a corresponding entry of a control stack, the decode unit foregoes generating second micro-operations for the second return instruction that check the corresponding entry of the control stack against a corresponding entry of the data stack for the second return instruction.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements features of the above disclosure.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for executing a return instruction on a processor, the method comprising:
predicting a first target return address for a first return instruction based on a first return address stack entry;
responsive to detecting that a first indicator associated with the first return address stack entry indicates that the first predicted target return address is not guaranteed to match a corresponding entry of a control stack, checking the corresponding entry of the control stack against a corresponding entry of a data stack to verify the return address for the first return instruction;
predicting a second target return address for a second return instruction based on a second return address stack entry; and
responsive to detecting that a second indicator associated with the second return address stack entry indicates that the second predicted target return address is guaranteed to match a corresponding address of the control stack, foregoing checking the corresponding address of the control stack against a corresponding address of the data stack for the second return instruction.

2. The method of claim 1, wherein checking the corresponding address of the control stack against a corresponding address of the data stack to verify the return address for the first return instruction comprises:

for decoding of the first return instruction, generating micro-operations to fetch the corresponding address of the control stack, compare the corresponding address of the control stack to the corresponding address of the data stack, and generate an exception if the corresponding address of the data stack and the corresponding address of the control stack are not equal.

3. The method of claim 1, wherein foregoing checking the corresponding address of the control stack against a corresponding address of the data stack for the second return instruction comprises:

for decoding the second return instruction, generating no micro-operations to compare the corresponding address of the control stack against the corresponding address of the data stack for the second return instruction.

4. The method of claim 1, further comprising:

detecting a misprediction for the second return instruction.

5. The method of claim 4, further comprising:

responsive to detecting the misprediction, flushing the second return instruction and younger instructions and re-executing the second return instruction in a mode that includes checking the corresponding address of the control stack against a corresponding address of the data stack for the second return instruction.

6. The method of claim 5, wherein detecting the misprediction comprises:

detecting that the return address popped from the data stack is different than the second predicted target return address.

7. The method of claim 1, further comprising generating the first indicator by:

responsive to predicting a call instruction corresponding to the first return instruction, including the first indicator indicating that the first predicted target return address is not guaranteed to match a corresponding address of the control stack in the first return address stack entry.

8. The method of claim 1, further comprising generating the second indicator by:

responsive to predicting that one of an instruction to modify the control stack is executed or a write to the control stack is performed, modifying the second indicator to indicate that the second predicted target return address is not guaranteed to match a corresponding address of the control stack.

9. The method of claim 1, further comprising generating the second indicator by:

responsive to detecting that a buffer underflow occurs on the return address stack, modifying the second indicator to indicate that the second predicted target return address is not guaranteed to match a corresponding address of the control stack.

10. The method of claim 1, further comprising:

responsive to predicting a call instruction, foregoing updating the control stack for the call instruction.

11. A computing pipeline for executing a return instruction, the computing pipeline comprising:

a return address stack;
a misprediction detector;
a decode unit; and
a branch predictor,
wherein the branch predictor is configured to:
predict a first target return address for a first return instruction based on a first return address stack entry, and predict a second target return address for a second return instruction based on a second return address stack entry, wherein, responsive to the decode unit detecting that a first indicator associated with the first return address stack entry indicates that the first predicted target return address is not guaranteed to match a corresponding address of a control stack, the decode unit is configured to generate first micro-operations for the first return instruction, the first micro-operations configured to check the corresponding address of the control stack against a corresponding address of a data stack to verify the return address for the first return instruction, and wherein, responsive to the decode unit detecting that a second indicator associated with the second return address stack entry indicates that the second predicted target return address is guaranteed to match a corresponding address of the control stack, the decode unit is configured to forego generating second micro-operations for the second return instruction that are configured to check the corresponding address of the control stack against a corresponding address of the data stack for the second return instruction.

12. The computing pipeline of claim 11, wherein the first micro-operations are configured to check the corresponding address of the control stack against a corresponding address of the data stack to verify the return address for the first return instruction by:

fetching the corresponding address of the control stack, comparing the corresponding address of the control stack to the corresponding address of the data stack, and generating an exception if the corresponding address of the data stack and the corresponding address of the of the control stack are not equal.

13. The computing pipeline of claim 11, further comprising:

a misprediction detector configured to detect a misprediction for the second return instruction.

14. The computing pipeline of claim 13, wherein the misprediction detector is further configured to:

responsive to detecting the misprediction, cause the second return instruction and younger instructions to be flushed and to cause the second return instruction to be re-executed in a mode that includes checking the corresponding address of the control stack against a corresponding address of the data stack for the second return instruction.

15. The computing pipeline of claim 13, wherein the misprediction detector is configured to detect the misprediction by:

detecting that the return address popped from the data stack is different than the second predicted target return address.

16. The computing pipeline of claim 11, wherein the branch predictor is further configured to cause the first indicator to be generated by:

responsive to predicting a call instruction corresponding to the first return instruction, causing the first indicator indicating that the first predicted target return address is not guaranteed to match a corresponding address of the control stack to be included in the first return address stack entry.

17. The computing pipeline of claim 11, wherein the branch predictor is further configured to cause the second indicator to be generated by:

responsive to predicting that one of an instruction to modify the control stack is executed or a write to the control stack is performed, causing the second indicator to be modified to indicate that the second predicted target return address is not guaranteed to match a corresponding address of the control stack.

18. The computing pipeline of claim 11, wherein the branch predictor is further configured to cause the second indicator to be generated by:
responsive to detecting that a buffer underflow occurs on the return address stack, causing the second indicator to be modified to indicate that the second predicted target return address is not guaranteed to match a corresponding address of the control stack.

19. A computing device comprising:
a memory configured to store instructions; and
a computing pipeline for executing a return instruction from the memory, the computing pipeline comprising:
a return address stack;
a misprediction detector;
a decode unit; and
a branch predictor,
wherein the branch predictor is configured to:
predict a first target return address for a first return instruction based on a first return address stack entry, and
predict a second target return address for a second return instruction based on a second return address stack entry,
wherein, responsive to the decode unit detecting that a first indicator associated with the first return address stack entry indicates that the first predicted target return address is not guaranteed to match a corresponding address of a control stack, the decode unit is configured to generate first micro-operations for the first return instruction, the first micro-operations configured to check the corresponding address of the control stack against a corresponding address of a data stack to verify the return address for the first return instruction, and
wherein, responsive to the decode unit detecting that a second indicator associated with the second return address stack entry indicates that the second predicted target return address is not guaranteed to match a corresponding address of the control stack, the decode unit is configured to forego generating second micro-operations for the second return instruction that are configured to check the corresponding address of the control stack against a corresponding address of the data stack for the second return instruction.

20. The computing device of claim 19, wherein the first micro-operations are configured to check the corresponding address of the control stack against a corresponding address of the data stack to verify the return address for the first return instruction by:
fetching the corresponding address of the control stack, comparing the corresponding address of the control stack to the corresponding address of the data stack, and generating an exception if the corresponding address of the data stack and the corresponding address of the control stack are not equal.

* * * * *